US005884896A

United States Patent [19]

Kono et al.

[11] Patent Number: 5,884,896

[45] Date of Patent: Mar. 23, 1999

[54] SOLENOID DRIVING APPARATUS

[75] Inventors: Hiromi Kono; Tsuneo Adachi, both of Higashimatsuyama, Japan

[73] Assignee: Zexel Corporation, Tokyo, Japan

[21] Appl. No.: 756,909

[22] Filed: Nov. 26, 1996

[30] Foreign Application Priority Data

Dec. 7, 1995 [JP] Japan .................................... 7-345205

[51] Int. Cl.[6] ...................................................... F16K 31/02

[52] U.S. Cl. .................... 251/129.05; 361/154; 361/187; 123/490

[58] Field of Search ......................... 251/129.01, 129.05; 361/152, 154, 187; 123/490, 294

[56] References Cited

U.S. PATENT DOCUMENTS

| | | | |
|---|---|---|---|
| 4,764,840 | 8/1988 | Petrie et al. | 361/154 |
| 4,858,103 | 8/1989 | Takeuchi et al. | 251/129.05 X |
| 5,293,551 | 3/1994 | Perkins et al. | 361/154 |
| 5,531,198 | 7/1996 | Matsuura | 123/294 |
| 5,647,387 | 7/1997 | Tsutsui | 251/129.05 X |

*Primary Examiner*—Kevin Lee

[57] ABSTRACT

A solenoid driving apparatus includes at least two solenoids of which driving periods do not overlap, a driving unit for driving each solenoid, and a signal generating unit for giving the driving unit a control signal information of each solenoid. The driving unit includes circuit sections jointly used with regard to the driving of each solenoid, and drives each solenoid based on the control signal information corresponding to each solenoid. The signal generating unit generates the control signal information of each solenoid which is given to the driving unit based on the drive pulse signal corresponding to each solenoid. Also, while a control signal information is given to the driving unit based on the drive pulse signal corresponding to one solenoid, the signal generating unit does not accept the input of any drive pulse signal even when a drive pulse corresponding to the other solenoid is generated by a noise. Thereby, malfunctions and adverse effects on the driving apparatus due to the simultaneous use of common circuit sections of the driving unit for driving more than one solenoid can be prevented.

22 Claims, 8 Drawing Sheets

SOLENOID DRIVING APPARATUS

BACKGROUND OF THE INVENTION

The present invention relates to a solenoid driving apparatus.

A fuel injection valve driven by a solenoid is known. A fuel injection valve of this type has a stator containing a solenoid, and an armature connected to a needle, for example. The armature is designed to be attracted by the stator and energized by a spring to separate from the stator. When the solenoid is not excited, the armature is energized by the spring, and the fuel injection valve is closed. When the solenoid is excited, the armature is attracted by the stator against the spring, and the fuel injection valve is opened. In a fuel injection control of an internal combustion engine, this fuel injection valve is provided for each cylinder of the internal combustion engine, and a driving apparatus drives solenoids of each fuel injection valve based on drive pulse signals corresponding to each fuel injection valve. In a driving apparatus of this type, it is possible to share a circuit with regard to driving solenoids of fuel injection valves of which injection periods do not overlap. By this, it is possible to decrease the number of circuit parts and cost.

However, when circuits are shared, there is a fear that a noise mixed in a drive pulse signal may adversely affect the driving apparatus. That is, when a noise is mixed in a drive pulse signal, while a solenoid of one fuel injection valve is driven, a solenoid of the other fuel injection valve may be driven by the noise mixed in the drive pulse signal. In this condition, since both fuel injection valves use common circuits at the same time, it causes a hindrance to the driving apparatus and its operation. For this reason, prevention of malfunctioning due to the noise mixed in the drive pulse signal is desired.

Also, in a driving apparatus like this, from a viewpoint that the closing time of the fuel injection valve is shortened, it is desired that a residual magnetic flux due to eddy currents of the stator and the armature is degaussed by inversely exciting the solenoid for a prescribed time by impressing a voltage with an inverse polarity compared with a polarity during driving, following the end of a holding period, and thereby the resetting of the armature by the spring is promoted.

However, if the solenoid is inversely excited, there is a fear that a noise mixed in a drive pulse signal may cause a hindrance to the driving apparatus. That is, while the solenoid is inversely excited, a starting period signal which permits an impression of a high voltage to the solenoid may be generated by the noise mixed in the drive pulse signal. Since the high voltage and the inverse voltage are simultaneously impressed to a drive circuit of the solenoid under this condition, it causes a hindrance to the driving apparatus and its operation. For this reason, such an inconvenience should be avoided.

SUMMARY OF THE INVENTION

It is an object of the present invention to provide an improved solenoid driving apparatus.

Another object of the present invention is to provide a solenoid driving apparatus which is capable of simplifying circuit composition and realizing cost reduction by providing common circuit sections with regard to driving at least two solenoids of which driving periods do not overlap.

Still another object of the present invention is to provide a solenoid driving apparatus which is capable of preventing malfunctions due to a simultaneous use of common circuit sections by a noise mixed in a drive pulse signal.

Still another object of the present invention is to provide a solenoid driving apparatus which is capable of shortening a drive finishing time of a solenoid actuator by inversely exciting a solenoid for a prescribed time following an end of a holding period.

Still another object of the present invention is to provide a solenoid driving apparatus which is capable of preventing a generation of a starting period signal which permits an impression of a high voltage by a noise mixed in a drive pulse signal in the middle of inversely exciting the solenoid.

The above and other objects are attained by a solenoid driving apparatus comprising; at least two solenoids of which driving periods do not overlap; driving means, responsive to control signal informations corresponding to the solenoids respectively, for driving each of the solenoids based on a corresponding control signal information, said driving means including at least one circuit section shared for driving each of said solenoids; and signal generating means, responsive to drive pulse signals corresponding to the solenoids respectively, for generating the control signal information for each of the solenoids based on a corresponding drive pulse signal and giving the control signal information to said driving means, said signal generating means rejecting an input of any drive pulse signal corresponding to another solenoid while the control signal information is given to said driving means based on the drive pulse signal corresponding to one solenoid.

According to a composition like this, since driving means has at least one common circuit section for driving at least two solenoids, it is possible to plan simplification and cost reduction of circuit composition. Also, since the input of any drive pulse signal corresponding to another solenoid is not accepted while a control signal information is given based on a drive pulse signal corresponding to one solenoid, it is possible to prevent malfunctions and adverse effects on the driving apparatus due to the simultaneous use of common circuit sections by a noise mixed in another drive pulse signal.

Also, the above and other objects are attained by a solenoid driving apparatus comprising; a solenoid; signal generating means, responsive to a drive pulse signal, for giving a starting period signal for regulating a starting period, a holding period signal for regulating a holding period following the starting period, and an inverse excitation signal for regulating an inverse excitation period following the holding period, said signal generating means prohibiting any output of the starting period signal during an output of the inverse excitation signal; and driving means, responsive to the starting period signal, holding period signal and inverse excitation signal from said signal generating means, for impressing a high voltage to said solenoid while the starting period signal is given, supplying a holding current to said solenoid while the holding period signal is given, and impressing an inverse voltage to said solenoid while the inverse excitation signal is given.

According to a composition like this, since the solenoid is inversely excited following an end of the holding period, a residual magnetic flux due to eddy currents of a stator and armature of a solenoid actuator is degaussed, and the resetting of the armature by a spring is promoted. That is, a drive finishing time of the solenoid actuator can be shortened. In addition, since the output of a starting period signal is prohibited while an inverse excitation signal is given, no high voltage is impressed while an inverse voltage is impressed to the solenoid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will be appreciated and better understood by means of the following description and accompanying drawings, which are given by way of illustration only and thus are not limitative of the present invention and wherein.

DETAILED DESCRIPTION OF THE INVENTION

Figure 1:
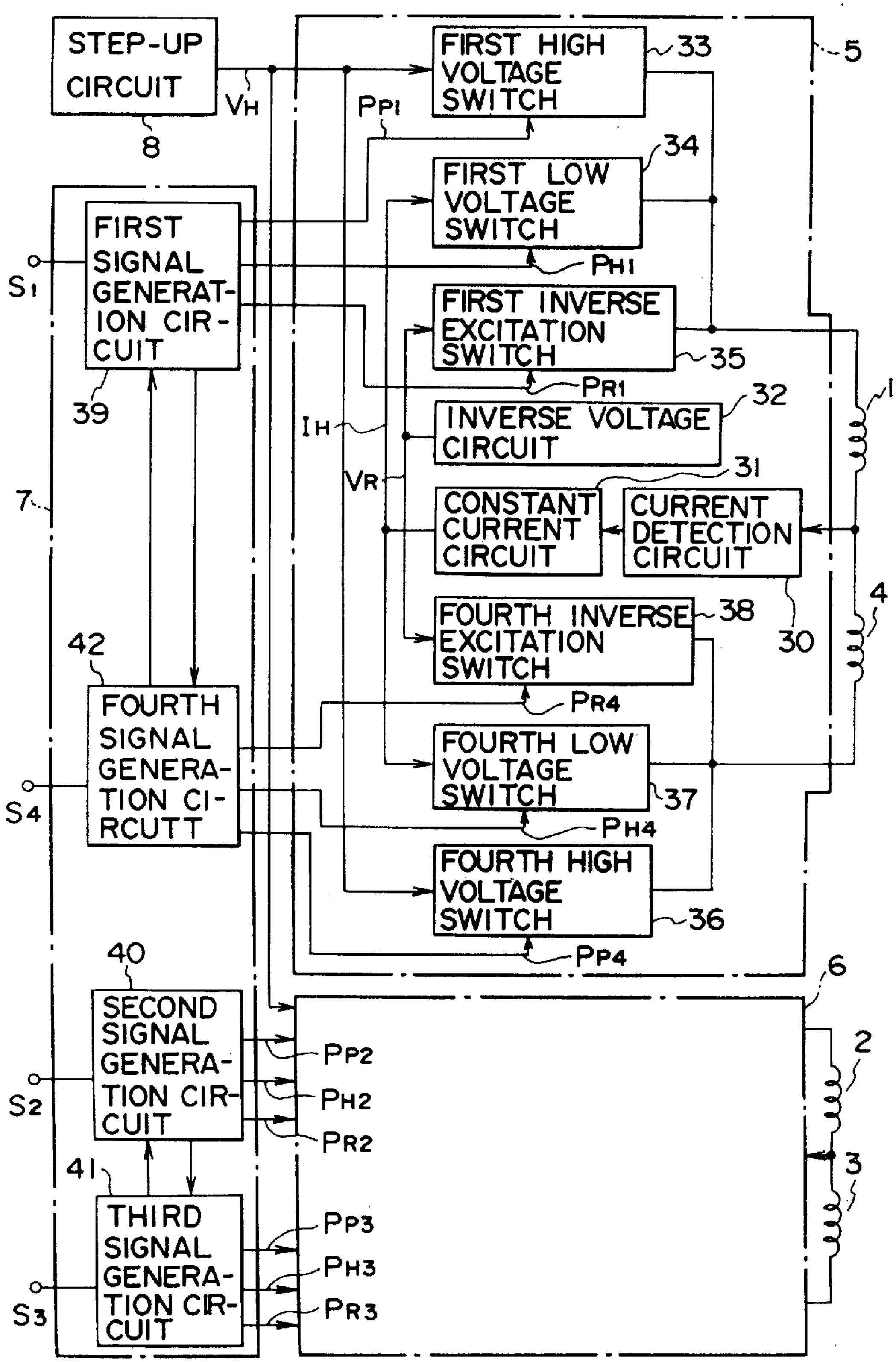
FIG. 1 is a block diagram showing a first embodiment of a solenoid driving apparatus according to the present invention.

The first embodiment of FIG. 1 shows application to solenoids of fuel injection valves provided in a four-cylinder internal combustion engine.

In FIG. 1, reference numerals 1, 2, 3 and 4 are solenoids of a first, second, third and fourth fuel injection valves, respectively. Reference numerals 5 and 6 are first and second driving means, respectively. A reference numeral 7 is signal generating means, and a reference numeral 8 is a step-up circuit.

The first fuel injection valve having the solenoid 1 is provided at a first cylinder of an internal engine not shown in figures. The second fuel injection valve having the solenoid 2 is provided at a second cylinder of the internal engine. The third fuel injection valve having the solenoid 3 is provided at a third cylinder of the internal engine. The fourth fuel injection valve having the solenoid 4 is provided at a fourth cylinder of the internal engine.

Figure 2:
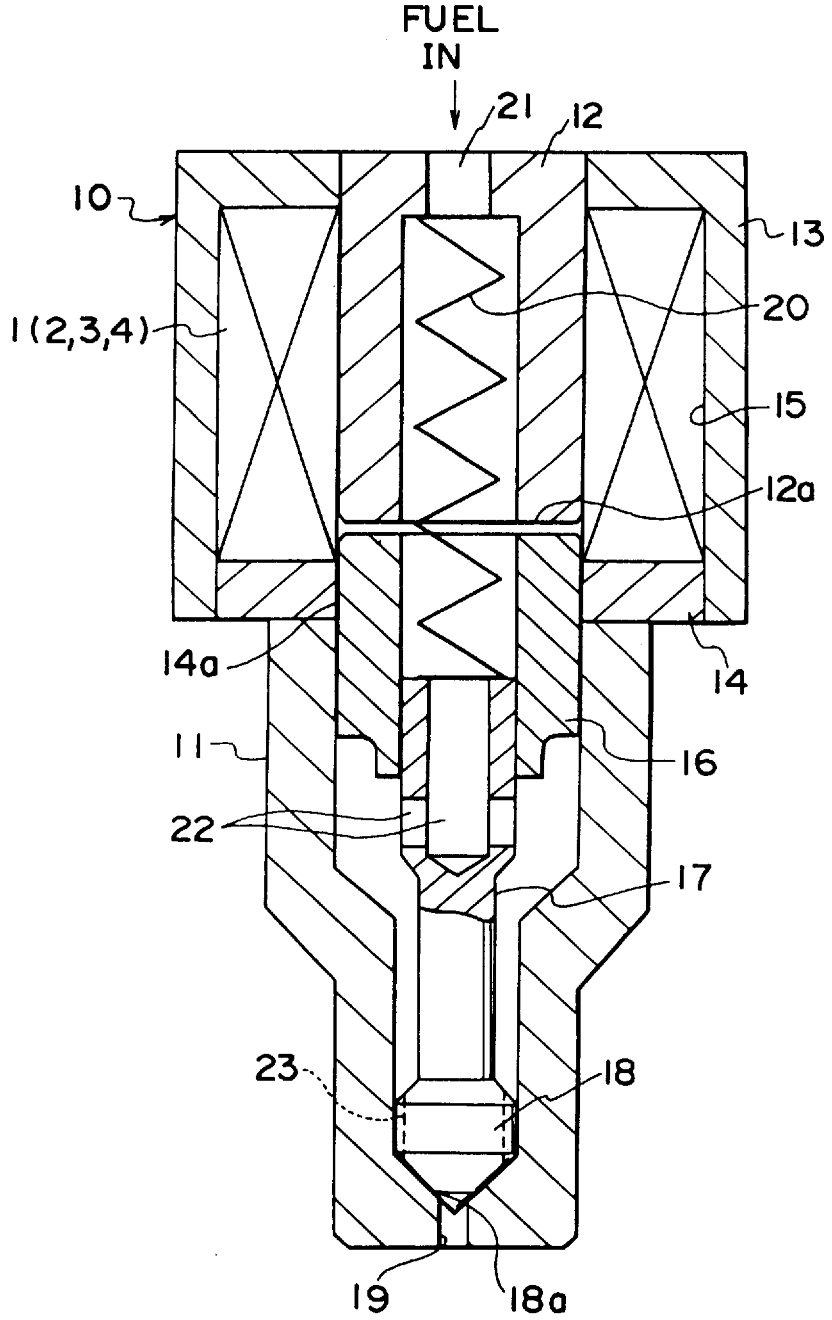
FIG. 2 is a composition drawing showing an example of first, second, third and fourth fuel injection valves in FIG. 1.

FIG. 2 is a composition drawing showing an example of the first through the fourth fuel injection valves. In FIG. 2, a reference numeral 10 is a stator, and a reference numeral

11 is a valve housing provided at a lower part of the stator 10. The stator 10 has a first cylinder part 12, a second cylinder part 13 and a ring-shaped part 14. The stator 10 contains the solenoid 1 (2, 3 or 4) in a solenoid housing 15 which is formed with the first and second cylinders 12 and 13 and the ring-shaped part 14. Below the first cylinder part 12 of the stator 10, there is provided a tubular armature 16. The armature 16 is provided so as to slide freely in upward and downward directions with an end face 14*a* of the ring-shaped part 14 of the stator 10 and an inside face of the valve housing 11 as a sliding surface. At a lower part of the armature 16, there is connected a valve stem 17. The valve stem 17 moves together with the armature 16. At a lower end of the valve stem 17, there is provided a needle 18. By an opening/closing of a valve seat part 18*a* of the needle 18, an injection nozzle 19 which is formed at the valve housing 11 is opened/closed. A reference numeral 20 is a spring. The spring 20 energizes the armature 16 and the valve stem 17 in a direction in which the injection nozzle 19 is closed. Fuel is supplied from a fuel port 21 which is formed in an upper end face of the first cylinder part 12 of the stator 10 and given to a valve seat part 18*a* via an inside of the first cylinder part 12 of the stator 10, an inside of the armature 16, a fuel path 22 which is formed in the valve stem 17, and a fuel path 23 which is formed in the needle 18.

In a composition like this, when the solenoid 1 (2, 3 or 4) is not excited, the armature 16 and the valve stem 17 are energized downward by the spring 20, and the valve seat part 18a is closed. When the solenoid 1 (2, 3 or 4) is excited, the armature 16 and the valve stem 17 are attracted by the stator 10 against an energizing force of the spring 20, and the valve seat part 18*a* is opened.

Reverting to FIG. 1, the first driving means 5 drives the solenoid 1 of the first fuel injection valve and the solenoid 4 of the fourth fuel injection valve, and the second driving means 6 drives the solenoid 2 of the second fuel injection valve and the solenoid 3 of the third fuel injection valve. Since the first fuel injection valve having the solenoid 1 and the fourth fuel injection valve having the solenoid 4 are respectively provided at the first and fourth cylinders of the internal engine, their injection periods do not overlap each other. Also, since the second fuel injection valve having the solenoid 2 and the third fuel injection valve having the solenoid 3 are respectively provided at the second and third cylinders of the internal engine, their injection periods do not overlap each other.

The first driving means 5 has a current detection circuit 30, a constant current circuit 31, an inverse voltage circuit 32, a first high-voltage switch 33, a first low-voltage switch 34, a first inverse excitation switch 35, a fourth high-voltage switch 36, a fourth low-voltage switch 37 and a fourth inverse excitation switch 38. The current detection circuit 30 detects a current which flows through the solenoid 1 of the first fuel injection valve and the solenoid 4 of the fourth injection valve. The constant current circuit 31 gives a constant-current controlled holding current $I_H$ so that a detection current of the current detection circuit 30 is a predetermined value. The inverse voltage circuit 32 generates an inverse voltage $V_R$ (−100 V, for example) with an inverse polarity compared with a polarity during driving. The current detection circuit 30, the constant current circuit 31 and the inverse voltage circuit 32 are jointly used for driving the solenoids 1 and 4 of first and fourth fuel injection valves. The first high-voltage switch 33 inputs a high voltage $V_H$ (150 V, for example) of the step-up circuit 8 and a first starting period signal $P_{P1}$ of the signal generating means 7, and gives the high voltage $V_H$ to the solenoid 1 of the first fuel injection valve while the first starting period signal $P_{P1}$ is given. The first low-voltage switch 34 inputs the holding current $I_H$ of the constant current circuit 31 and a first holding period signal $P_{H1}$ of the signal generating means 7, and gives the holding current $I_H$ to the solenoid 1 of the first fuel injection valve while the first holding period signal $P_{H1}$ is given. The first inverse excitation switch 35 inputs the inverse voltage $V_R$ of the inverse voltage circuit 32 and a first inverse excitation signal $P_{R1}$ of the signal generating means 7, and gives the inverse voltage $V_R$ to the solenoid 1 of the first fuel injection valve while the first inverse excitation signal $P_{R1}$ is given. The fourth high-voltage switch 36 inputs the high voltage $V_H$ of the step-up circuit 8 and a fourth starting period signal $P_{P4}$ of the signal generating means 7, and gives the high voltage $V_H$ to the solenoid 4 of the fourth fuel injection valve while the fourth starting period signal $P_{P4}$ is given. The fourth low-voltage switch 37 inputs the holding current $I_H$ of the constant current circuit 31 and a fourth holding period signal $P_{H4}$ of the signal generating means 7, and gives the holding current $I_H$ to the solenoid 4 of the fourth fuel injection valve while the fourth holding period signal $P_{H4}$ is given. The fourth inverse excitation switch 38 inputs the inverse voltage $V_R$ of the inverse voltage circuit 32 and a fourth inverse excitation signal $P_{R4}$ of the signal generating means 7, and gives the inverse voltage $V_R$ to the solenoid 4 of the fourth fuel injection valve while the fourth inverse excitation signal $P_{R4}$ is given.

The second driving means 6 inputs the high voltage $V_H$ of the step-up circuit 8 and a second starting period signal $P_{P2}$, a second holding period signal $P_{H2}$, a second inverse excitation signal $P_{R2}$, a third starting period signal $P_{P3}$, a third holding period signal $P_{H3}$ and a third inverse excitation signal $P_{R3}$ of the signal generating means 7. The second driving means 6 is composed in the same way as the first driving means 5 with regard to the solenoids 2 and 3 of the second and third fuel injection valves. Therefore, a current detection circuit, a constant current circuit and an inverse voltage circuit are jointly used for driving the solenoids 2 and 3 of the second and third fuel injection valves.

The signal generating means 7 has a first signal generation circuit 39, a second signal generation circuit 40, a third signal generation circuit 41 and a fourth signal generation circuit 42. The first signal generation circuit 39 inputs a first drive pulse signal $S_1$ and outputs the first starting period signal $P_{P1}$, the first holding period signal $P_{H1}$ and the first inverse excitation signal $P_{R1}$. The second signal generation circuit 40 inputs a second drive pulse signal $S_2$ and outputs the second starting period signal $P_{P2}$, the second holding period signal $P_{H2}$ and the second inverse excitation signal $P_{R2}$. The third signal generation circuit 41 inputs a third drive pulse signal $S_3$ and outputs the third starting period signal $P_{P3}$, the third holding period signal $P_{H3}$ and the third inverse excitation signal $P_{R3}$. The fourth signal generation circuit 42 inputs a fourth drive pulse signal $S_4$ and outputs the fourth starting period signal $P_{P4}$, the fourth holding period signal $P_{H4}$ and the fourth inverse excitation signal $P_{R4}$.

Figure 3:
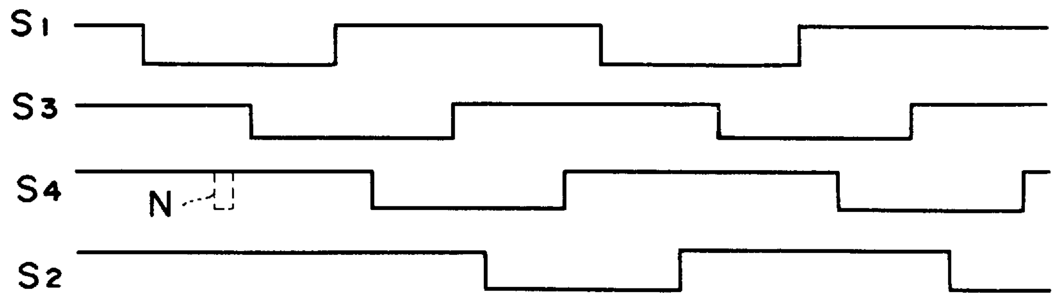
FIG. 3 is a waveform chart illustrating first, second, third and fourth drive pulse signals in FIG. 1.

FIG. 3 is a waveform chart of the first through fourth drive pulse signals $S_1$–$S_4$. Low-level portions of the first through fourth drive pulse signals $S_1$–$S_4$ are driving periods (injection periods) of the solenoids 1–4 of the first through fourth fuel injection valves, and High-level portions are non-driving periods (no-injection periods) of the solenoids 1–4. As it is clear from FIG. 3, the injection periods of the first and fourth fuel injection valves do not overlap each other, and the injection periods of the second and third fuel injection valves do not overlap each other. Therefore, as mentioned above, it is possible to use the current detection circuit, the constant current circuit and the inverse voltage circuit in common.

Figure 4:
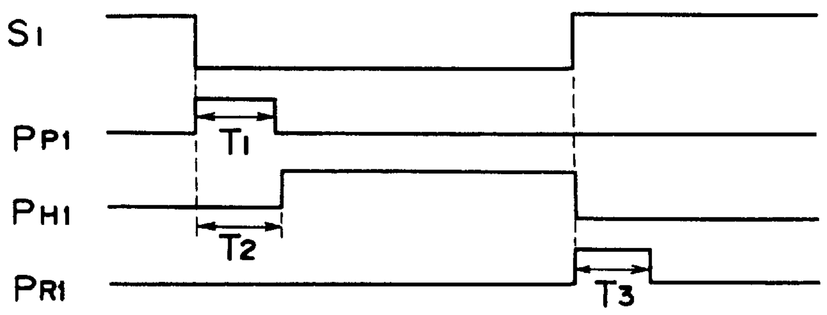
FIG. 4 is and explanatory drawing for explaining a relationship of a drive pulse signal, a starting period signal, a holding period signal and an inverse excitation signal in FIG. 1.

FIG. 4 is an explanatory drawing for explaining the relationship of the drive pulse signal, the starting period signal, the holding period signal and the inverse excitation signal. In FIG. 4, the generation of the starting period signal, the holding period signal and the inverse excitation signal is explained using the first signal generation circuit 39 as an example. The first starting period signal $P_{P1}$ is High level for a first prescribed time $T_1$ after the first drive pulse signal $S_1$ falling to Low level. The first holding period signal $P_{H1}$ becomes High level with the lapse of a second prescribed time $T_2$ after the first drive pulse signal $S_1$ falling to Low level and becomes Low level with the first drive pulse signal $S_1$ rising to High level. The second prescribed time $T_2$ is set to be slightly longer than the first prescribed time $T_1$. The first inverse excitation signal $P_{R1}$ is High level for a third prescribed time $T_3$ after the first drive pulse signal $S_1$ rising to High level. As mentioned later, while the first starting period signal $P_{P1}$ is High level, the high voltage $V_H$ is impressed to the solenoid 1 of the first fuel injection valve. While the first holding period signal $P_{H1}$ is High level, the holding current $I_H$ is given to the solenoid 1. While the first inverse excitation signal $P_{R1}$ is High level, the inverse voltage $V_R$ is impressed to the solenoid 1. Likewise, the second, third and fourth signal generation circuits 40, 41 and 42, following the drive pulse signals $S_2$–$S_4$, generate the starting period signals $P_{P2}$–$P_{P4}$, the holding period signals $P_{H2}$–$P_{H4}$ and the inverse excitation signals $P_{R2}$–$P_{R4}$.

Reverting to FIG. 1, the first signal generation circuit 39 and the fourth signal generation circuit 42 are composed so as to perform an exclusive control with regard to the input of drive pulse signals. That is, when one signal generation circuit is driving a solenoid based on a corresponding drive pulse signal, the other signal generation circuit does not accept the input of corresponding drive pulse signal. Likewise, the second signal generation circuit 40 and the third signal generation circuit 41 are composed so as to perform an exclusive control with regard to the input of drive pulse signals. Taking the first signal generation circuit 39 and the fourth signal generation circuit 42, for example, when the solenoid 1 of the first fuel injection valve is driven based on Low level of the first drive pulse signal $S_1$, the fourth signal generation circuit 42 does not accept this Low-level signal even when the fourth drive pulse signal $S_4$ is made Low level by a noise N as shown with a broken line in FIG. 3. Therefore, the fourth signal generation circuit 42 does not output signals to the first driving means 5. Oppositely, when the solenoid 4 of the fourth fuel injection valve is driven based on Low level of the fourth drive pulse signal $S_4$, the first signal generation circuit 39 does not accept this Low-level signal even when the first drive pulse signal $S_1$ is made Low level by a noise. The same applies between the second signal generation circuit 40 and the third signal generation circuit 41.

Figure 5:
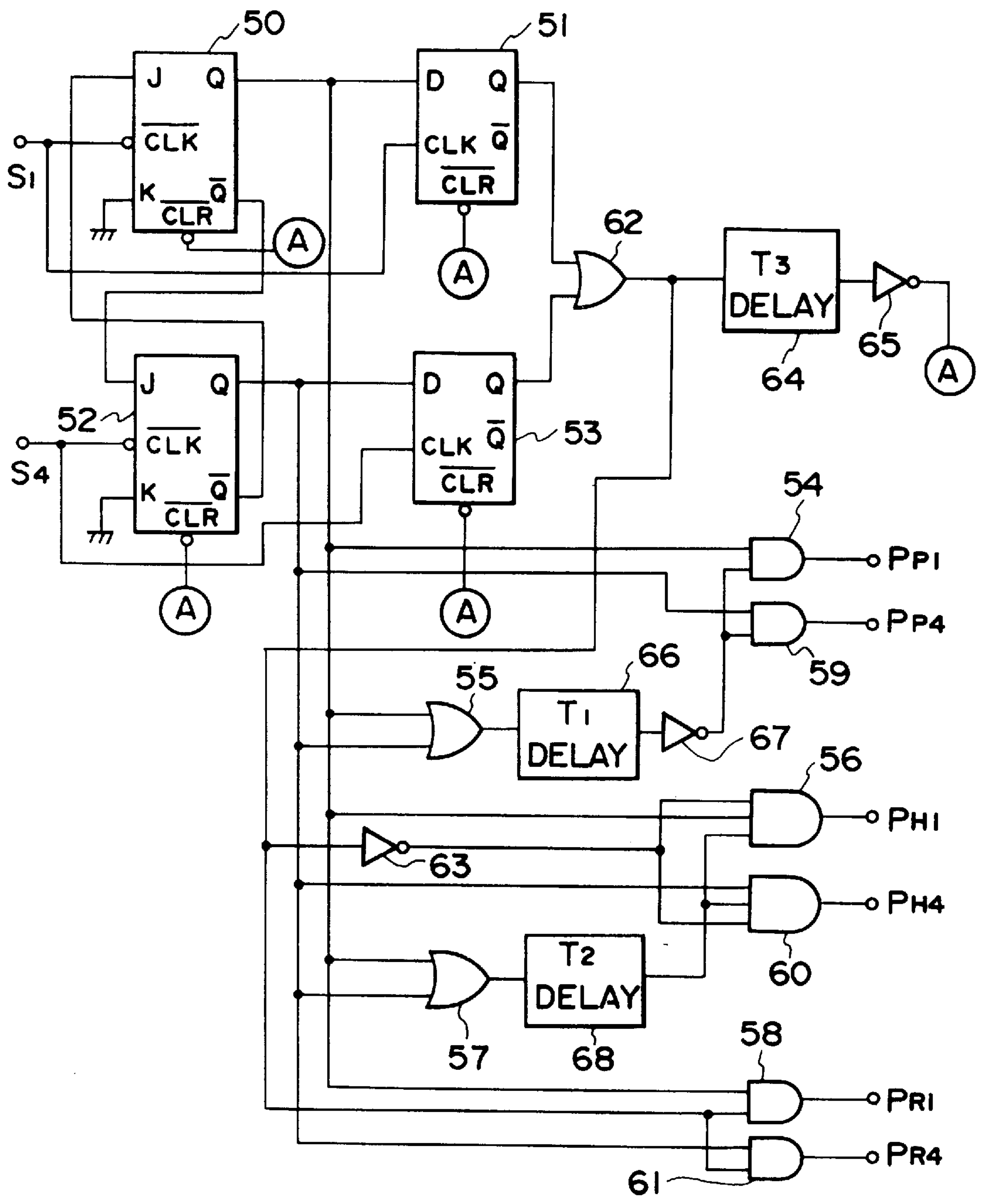
FIG. 5 is a circuit diagram showing an example of first and fourth signal generation circuits in FIG. 1.

FIG. 5 is a circuit diagram showing an example of the first signal generation circuit 39 and the fourth signal generation circuit 42.

The first drive pulse signal $S_1$ is given to a clock terminal $\overline{CLK}$ of a first JK-flip-flop 50 and a clock terminal CLK of a first D-flip-flop 51. The fourth drive pulse signal $S_4$ is given to a clock terminal $\overline{CLK}$ of a second JK-flip-flop 52 and a clock terminal CLK of a second D-flip-flop 53.

The first JK-flip-flop 50 at its J terminal is connected to a $\overline{Q}$ terminal of the second JK-flip-flop 52, and its K terminal is grounded. A Q output of the first JK-flip-flop 50 is given to a D terminal of the first D-flip-flop 51, an AND gate 54 for outputting the first starting period signal $P_{P1}$, a first OR gate 55, an AND gate 56 for outputting the first holding period signal $P_{H1}$, a second OR gate 57, and an AND gate 58 for outputting the first inverse excitation signal $P_{R1}$.

The second flip-flop 52 at its J terminal is connected to a $\overline{Q}$ terminal of the first JK-flip-flop 50, and its K terminal is grounded. A Q output of the second JK-flip-flop 52 is given to a D terminal of the second D-flip-flop 53, an AND gate 59 for outputting the fourth starting period signal $P_{P4}$, the first OR elate 55, an AND gate 60 for outputting the fourth holding period signal $P_{H4}$, the second OR gate 57, and an AND gate 61 for Outputting the fourth inverse excitation signal $P_{R4}$.

A Q output of the first D-flip-flop 51 and a Q output of the second D-flip-flop 53 are given to the AND gate 58 and the AND gate 61 via a third OR gate 62. The Q output of the first D-flip-flop 51 and the Q output of the second D-flip-flop 53 are also given to the AND gate 56 and the AND gate 60 via the third OR gate 62 and an inverter 63. The Q output of the first D-flip-flop 51 and the Q output of the second D-flip-flop 53 are further given to a $T_3$ delay circuit 64 via the third OR gate 62.

An output of the $T_3$ delay circuit 64, as shown with a reference alphabet A in FIG. 5, is given to clear terminals $\overline{CLR}$ of the first and second JK-flip-flop 50 and 52 and the first and second D-flip-flop 51 and 53 via an inverter 65. The $T_3$ delay circuit 64 give a delay time of the third prescribed time $T_3$ in FIG. 4.

An output of the first OR gate 55 is given to the AND gate 54 and the AND gate 59 via a $T_1$ delay circuit 66 and an inverter 67. The $T_1$ delay circuit 66 give a delay time of the first prescribed time $T_1$ in FIG. 4.

An output of the second OR gate 57 is given to the AND gate 56 and the AND gate 60 via a $T_2$ delay circuit 68. The $T_2$ delay circuit 68 give a delay time of the second prescribed time $T_2$ in FIG. 4.

Figure 6:
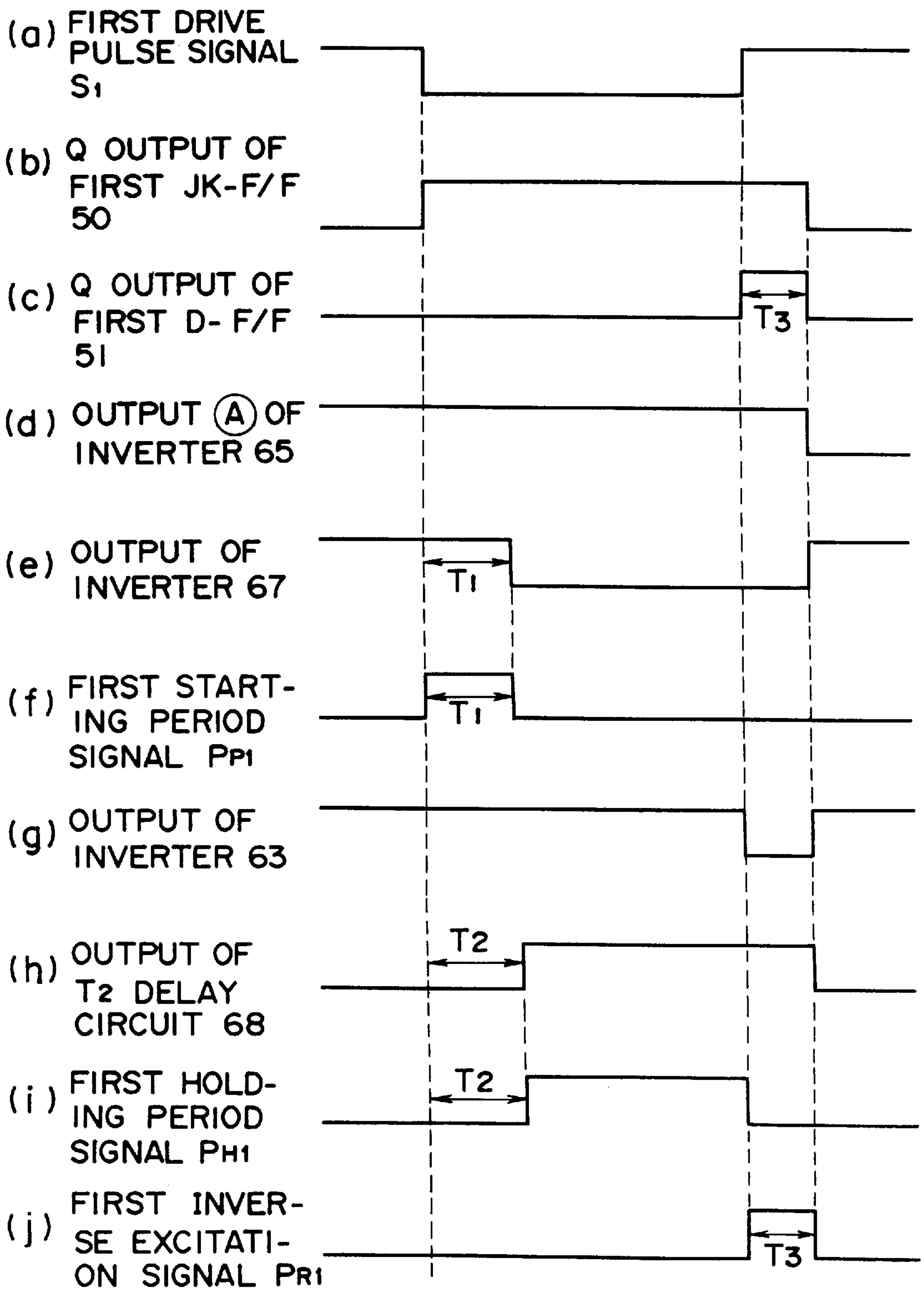
FIG. 6 is an operation timing chart related to a first drive pulse signal of FIG. 5.

FIG. 6 is an operation timing chart related to the first drive pulse signal $S_1$ of FIG. 5. The same applies to the fourth drive pulse signal $S_4$.

When the first drive pulse signal $S_1$ (a) is High level (no-injection period), the Q output (b) of the first JK-flip-flop 50 is "0", therefore, the Q output is "1". When the first drive pulse signal $S_1$ (a) is Low level (injection period), the Q output (b) of the first JK-flip-flop 50 is "1" and the $\overline{Q}$ output is "0". Since the $\overline{Q}$ output of the first JK-flip-flop 50 is the J input of the second JK-flip-flop 52, even when the fourth drive pulse signal $S_4$ is made Low level by the noise N as shown in FIG. 3, the second JK-flip-flop 52 does not accept this Low-level signal.

The Q output (c) of the first D-flip-flop 51 is "1" with the first drive pulse signal $S_1$ rising to High level. The Q output (c) of the first D-flip-flop 51 is delayed by the third prescribed time $T_3$ and given to the inverter 65. By this, an output (d) of the inverter 65 becomes Low level and each of the flip-flops 50 and 51 (or 52 and 53) is reset. Hence, the Q output (b) of the first JK-flip-flop 50 becomes "0" with the lapse of the third prescribed time $T_3$ after the first drive pulse signal $S_1$ rising to High level, and the Q output (c) of the first D-flip-flop 51 also becomes "0" with the lapse of the third prescribed time $T_3$ after the first drive pulse signal $S_1$ rising to High level.

The AND gate 54 for outputting the first starting period signal $P_{P1}$ inputs the Q output (b) of the first JK-flip-flop 50 and an output (e) of the inverter 67 which is the Q output (b) inverted after a delay of the first prescribed time $T_1$. Thereby, the AND gate 54 outputs the first starting period signal $P_{P1}$ (f) of High level for the first prescribed time $T_1$ after the first drive pulse signal $S_1$ falling to Low level. Additionally, the $T_1$ delay circuit 66 delays a rising portion of input signal only.

The AND gate 56 for outputting the first holding period signal $P_{H1}$ inputs the Q output (b) of the first JK-flip-flop 50, an output (h) of the $T_2$ delay circuit 68 which is the Q output (b) delayed by the second prescribed time $T_2$, and an output (g) of the inverter 63 which is the Q output (c) of the first D-flip-flop 51 inverted. Thereby, the AND gate 56 outputs the first holding period signal $P_{H1}$ (i) which becomes High level with the lapse of the second prescribed time $T_2$ after the first drive pulse signal $S_1$ falling to Low level and becomes Low level with the first drive pulse signal $S_1$ rising to High level. Additionally, the $T_2$ delay circuit 68 delays a rising portion of input signal only.

The AND gate 58 for outputting the first inverse excitation signal $P_{R1}$ inputs the Q output (b) of the first JK-flip-flop 50 and the Q output (c) of the first D-flip-flop 51. Thereby, the AND gate 58 outputs the first inverse excitation signal $P_{R1}$ (j) which becomes High level with the first drive pulse signal $S_1$ rising to High level and becomes Low level after the lapse of the third prescribed time $T_3$.

The Q output (b) of the first JK-flip-flop 50 is "1" till an end of the first inverse excitation signal $P_{R1}$ (j). Therefore, since the J input of the second JK-flip-flop 52 is the $\overline{Q}$ output of the first JK-flip-flop 50, even when the fourth drive pulse signal $S_4$ is made Low level by a noise while the first inverse excitation signal $P_{R1}$ (j) is generated, the second JK-flip-flop 52 does not accept Low level signal of the fourth drive pulse signal $S_4$. That is, the second JK-flip-flop 52 holds a condition that the Q output is "0" and the $\overline{Q}$ output is "1". Therefore, while the first starting period signal $P_{P1}$, the first holding period signal $P_{H1}$ and the first inverse excitation signal $P_{R1}$ are outputted, the AND gate 59, the AND gate 60 and the AND gate 61 never output the fourth starting period signal $P_{P4}$, the fourth holding period signal $P_{H4}$ and the fourth inverse excitation signal $P_{R4}$.

When the fourth drive pulse signal $S_4$ is given, corresponding circuits function in the same way as above. Also, the second signal generation circuit 40 and the third signal generation circuit 41 are composed in the same way as above.

In the above-mentioned arrangement, when the first drive pulse signal $S_1$ is Low level, the first starting period signal $P_{P1}$ is given from the first signal generation circuit 39 to the first high-voltage switch 33. Thereby, the high voltage $V_H$ is impressed to the solenoid 1 of the first fuel injection valve for the first prescribed time $T_1$. Next, by the lapse of the second prescribed time $T_2$ after the first drive pulse signal $S_1$ falling to Low level, the first holding period signal $P_{H1}$ is given to the first low-voltage switch 34. Thereby, the supply of the holding current $I_H$ to the solenoid 1 is started.

When the first drive pulse signal $S_1$ rises to High level, the output of the first holding period signal $P_{H1}$ is stopped and the supply of the holding current $I_H$ comes to an end. Simultaneously with this, the first inverse excitation signal $P_{R1}$ is given to the first inverse excitation switch 35, and the inverse voltage $V_R$ is impressed to the solenoid 1 for the third prescribed time $T_3$. By the impression of this inverse voltage $V_R$, a residual magnetic flux due to eddy currents of the stator 10 and the armature 16 is degaussed, and the resetting of the armature 16 by the spring 20 is promoted. That is, a drive finishing time of the fuel injection valve can be shortened.

When the solenoid 1 of the first fuel injection valve is driven by the first starting period signal $P_{P1}$, first holding period signal $P_{H1}$ and first inverse excitation signal $P_{R1}$ of the first signal generation circuit 39, as mentioned above, the fourth signal generation circuit 42 does not accept the input of the fourth drive pulse signal $S_4$. Accordingly, as shown in FIG. 3, even when the fourth drive pulse signal $S_4$ is made Low level by the noise N while the solenoid 1 of the fuel injection valve is driven, the fourth signal generation circuit 42 never generate the fourth starting period signal $P_{P4}$, the fourth holding period signal $P_{H4}$ and the fourth inverse excitation signal $P_{R4}$. Hence, the current detection circuit 30, the constant current circuit 31 and the inverse voltage circuit 32 are never used simultaneously to adversely affect the driving apparatus.

When the fourth drive pulse signal $S_4$ is given, the fourth signal generation circuit 42 gives the corresponding switch the fourth starting period signal $P_{P4}$, the fourth holding period signal $P_{H4}$ and the fourth inverse excitation signal $P_{R4}$, and the same operations as those described above are performed. Also, the same operations are performed between second and third drive pulse signals $S_2$ and $S_3$.

Although the current detection circuit 30, the constant current circuit 31 and the inverse voltage circuit 32 are jointly used in the above-mentioned embodiment, this is not intended to limit the scope of the invention.

Figure 7:
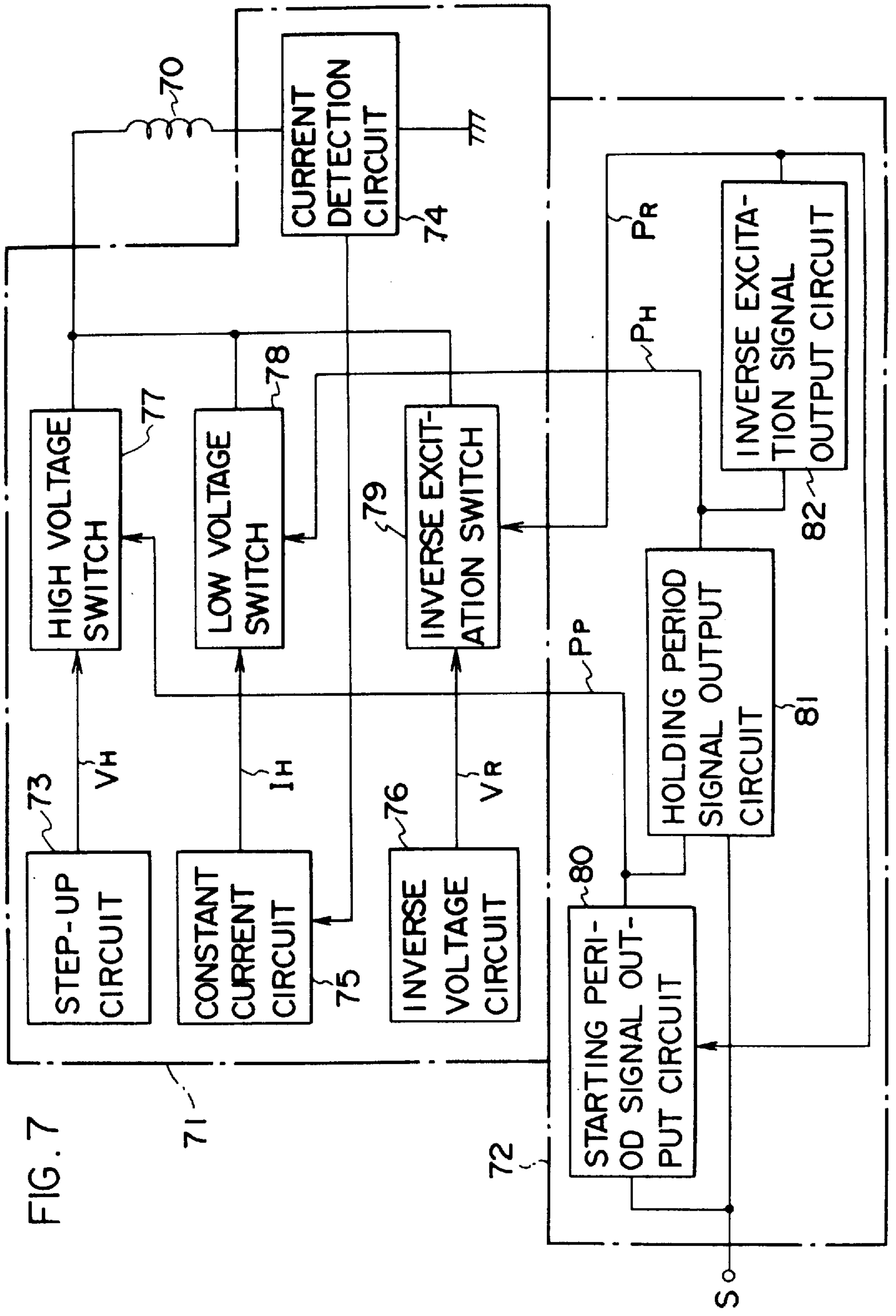
FIG. 7 is a block diagram showing a second embodiment of a solenoid driving apparatus according to the present invention.

FIG. 7 is a block diagram showing the second embodiment of the solenoid driving apparatus according to the present invention.

In FIG. 7, a reference numeral 70 is a solenoid of a fuel injection valve, a reference numeral 71 is driving means and a reference numeral 72 is signal generating means.

The driving means 71 has a step-up circuit 73, a current detection circuit 74, a constant current circuit 75, an inverse voltage circuit 76, a high-voltage switch 77, a low-voltage switch 78 and an inverse excitation switch 79. The step-up circuit 73 gives a high voltage $V_H$. The current detection circuit 74 detects a current which flows through the solenoid 70 of the fuel injection valve. The constant current circuit 75 gives a constant-current controlled holding current $I_H$ so that the current detected by the current detection circuit 74 is a predetermined value. The inverse voltage circuit 76 gives an inverse voltage $V_R$ with an inverse polarity compared with a polarity during driving. The high-voltage switch 77 inputs the high voltage $V_H$ of the step-up circuit 73 and a starting period signal $P_P$ of the signal generating means 72, and gives the high voltage $V_H$ to the solenoid 70 of the fuel injection valve while the starting period signal $P_P$ is given. The low-voltage switch 78 inputs the holding current $I_H$ of the constant current circuit 75 and a holding period signal $P_H$ of the signal generating means 72, and gives the holding current $I_H$ to the solenoid 70 of the fuel injection valve while the holding period signal $P_H$ is given. The inverse excitation switch 79 inputs the inverse voltage $V_R$ of the inverse voltage circuit 76 and an inverse excitation signal $P_R$ of the signal generating means 72, and gives the inverse voltage $V_R$ to the solenoid 70 of the fuel injection valve while the inverse excitation signal $P_R$ is given.

The signal generation means 72 has a starting period signal output circuit 80 for outputting the starting period signal $P_P$, a holding period signal output circuit 81 for outputting the holding period signal $P_H$, and an inverse Excitation signal output circuit 82 for outputting the inverse Excitation signal $P_R$. The starting period signal output circuit 80 outputs the starting period signal $P_P$ for a first prescribed time $t_1$ when a drive pulse signal S is inputted. The starting period signal output circuit 80 also inputs the inverse excitation signal $P_R$ of the inverse excitation signal output circuit 82 and prohibits the output of the starting period signal $P_P$ while the inverse excitation signal $P_R$ is given. The holding period signal output circuit 81 inputs the drive pulse signal S and the starting period signal $P_P$ of the starting period signal output circuit 80 and outputs the holding period signal $P_H$ for a period between an end of the starting period signal $P_P$ and an end of the drive pulse signal S. The inverse excitation signal output circuit 82 inputs the holding period signal $P_H$ of the holding period signal output circuit 81 and outputs the inverse excitation signal $P_R$ for a second prescribed time $t_2$ responding to an end of the holding period signal $P_H$.

Figure 8:
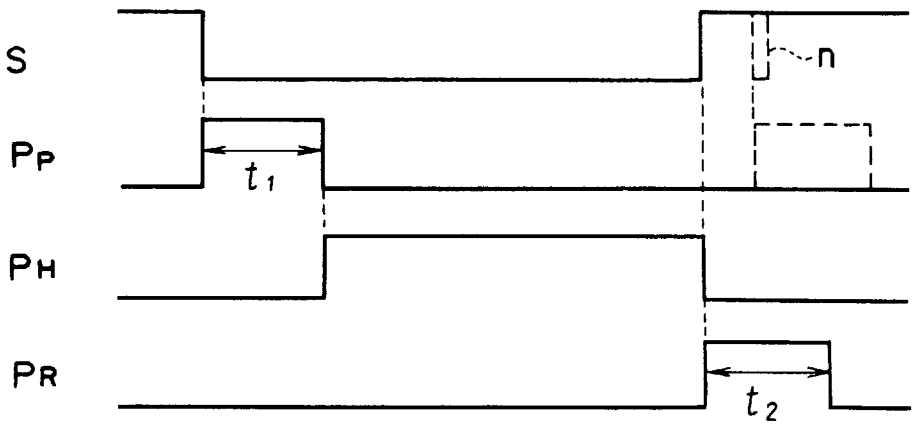
FIG. 8 is an explanatory drawing for explaining a relationship of a drive pulse signal, a starting period signal, a holding period signal and an inverse excitation signal in FIG. 7.

FIG. 8 is an explanatory drawing for explaining a relationship of the drive pulse signal S, the starting period signal $P_P$, the holding period signal $P_H$ and the inverse excitation signal $P_R$. A Low-level portion of the drive pulse signal S is a driving period (injection period) of the solenoid 70 of the fuel injection valve, and its High-level portion is a non-driving period (no-injection period) of the solenoid 70. The starting period signal $P_P$ becomes High level with the drive pulse signal S falling to Low level and becomes Low level with the lapse of the first prescribed time $t_1$. The holding period signal $P_H$ becomes High level with the starting period signal $P_P$ falling to Low level and becomes Low level with the drive pulse signal S rising to High level. The inverse excitation signal $P_R$ becomes High level with the holding period signal $P_H$ falling to Low level and becomes Low level with the lapse of the second prescribed time $t_2$. If the drive pulse signal S is made Low level by a noise n as shown by a broken line when the inverse excitation signal $P_R$ is High level, the starting period signal $P_P$ rises to High level as shown by a broken line. That is, the starting period signal $P_P$ is generated. As a result, the inverse voltage $V_R$ and the high voltage $V_H$ are simultaneously impressed to the driving means 71 to adversely affect the driving apparatus. As described above, since the present embodiment is arranged so that the output of the starting period signal $P_P$ is prohibited while the inverse excitation signal $P_R$ is given, the starting period signal $P_P$ is not generated even when the drive pulse signal S is made Low level by the noise n.

Figure 9:
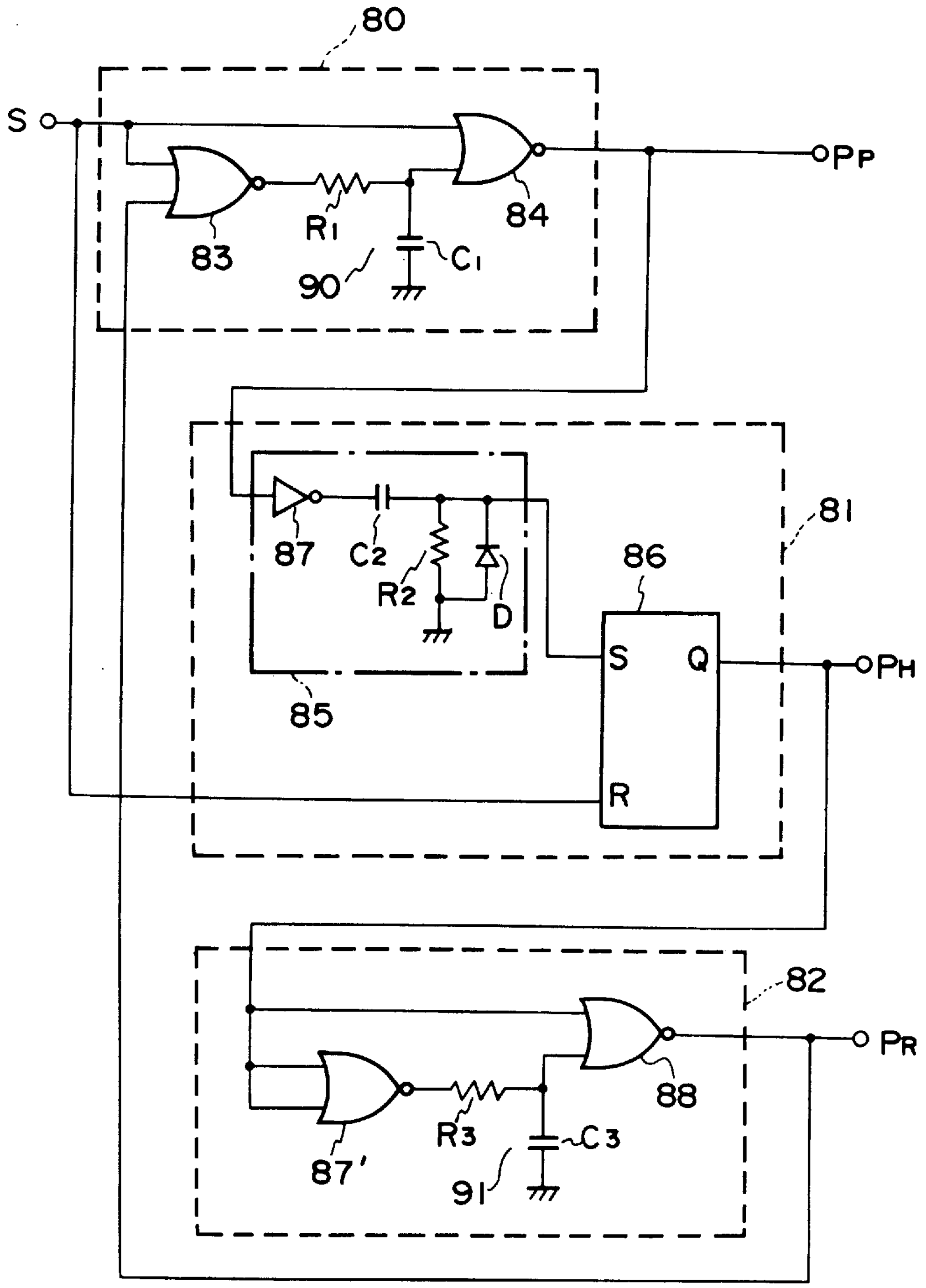
FIG. 9 is a circuit diagram showing an example of signal generating means in FIG. 7.

FIG. 9 is a circuit diagram showing an example of the signal generating means 72 of FIG. 7.

The starting period signal output circuit 80 has a first NOR gate 83, a first integration circuit 90 composed of a resistor $R_1$ and a capacitor $C_1$, and a second NOR gate 84. The first NOR gate 83 inputs the drive pulse signal S and the inverse excitation signal $P_R$. The first integration circuit 90 inputs an output of the first NOR gate 83. The second NOR gate 84 inputs an output of the first integration circuit 90 and the drive pulse signal S and outputs the starting period signal $P_P$. When the drive pulse signal S is Low level, the first NOR gate 83 gives a High-level output. The High-level output of the first NOR gate 83 is held at Low level for the first prescribed time ti by the first integration circuit 90. As a result, the second NOR gate 84 outputs the starting period signal $P_P$ which is High level for the first prescribed time $t_1$. When the inverse excitation signal $P_R$ is High level, the first NOR gate 83 does not give the High-level output even when the drive pulse signal S is made Low level by the noise n shown in FIG. 8. Therefore, the starting period signal $P_P$ is never outputted from the second NOR gate 84.

The holding period signal output circuit 81 has a starting period end detection circuit 85 and a RS-flip-flop 86. The starting period end detection circuit 85 inputs the starting period signal $P_P$ and outputs a starting period end pulse which indicates the fall of the starting period signal $P_P$ from High level to Low level, namely, an end of the starting period signal $P_P$. The RS-flip-flop 86, using the starting period end pulse of the starting period end detection circuit 85 as a setting input and the drive pulse signal S as a resetting input, gives the holding period signal $P_H$, which is High level from the end of the starting period signal $P_P$ to the end of the drive pulse signal S, as the Q output. The starting period end detection circuit 85 has an inverter 87 for inputting the starting period signal $P_P$, a differential circuit, composed of a capacitor $C_2$ and a resistor $R_2$, for inputting an output of the inverter 87, and a diode D for bypassing the resistor $R_2$ at a fall of the output of the inverter 87. The starting period end detection circuit 85 inverts the starting period signal $P_P$, clamps its falling edge with the diode D, and gives a differential output, which indicates its rising edge, namely, an end of the starting period signal $P_P$, as the starting period end pulse.

The inverse excitation signal output circuit 82 has a third NOR gate 87', a second integration circuit 91 composed of a resistor $R_3$ and a condenser $C_3$, and a fourth NOR gate 88. The third NOR gate 87' inputs the holding period signal $P_H$. The second integration circuit 91 inputs an output of the third NOR gate 87'. The fourth NOR gate 88 inputs an output of the second integration circuit 91 and the holding period signal $P_H$ and outputs the inverse excitation signal $P_R$. When the holding period signal $P_H$ becomes Low level from High level, the third NOR gate 87' gives the High-level output. The High-level output of the third NOR gate 87' is held at Low level for the second prescribed time $t_2$ by the second integration circuit 91. As a result, the fourth NOR gate 88 outputs the inverse excitation signal $P_R$ which is High level for the second prescribed time $t_2$ after the end of the the holding period signal $P_H$.

In the above-mentioned arrangement, when the drive pulse signal S becomes Low level form High level, the starting period signal $P_P$ is given from the starting period signal output circuit 80 to the high-voltage switch 77. Thereby, the high voltage $V_H$ is impressed to the solenoid 70 of the fuel injection valve for the first prescribed time $t_1$. When the starting period signal $P_P$ becomes Low level after the lapse of the first prescribed time $t_1$, the holding period signal $P_H$ is given from the holding period signal output circuit 81 to the low-voltage switch 78. Thereby, the supply of the holding current $I_H$ to the solenoid 70 is started. When the drive pulse signal S rises to High level, the output of the holding period signal $P_H$ is stopped and the supply of the holding current $I_H$ comes to an end. Simultaneously with this, the inverse excitation signal $P_R$ is given to the inverse excitation switch 79 and the inverse voltage $V_R$ is impressed to the solenoid 70 for the second prescribed time $t_2$. By the impression of this inverse voltage $V_R$, a residual magnetic flux due to eddy currents of a stator and an armature is degaussed, and the resetting of the armature by the spring is promoted. That is, a drive finishing time of the fuel injection valve can be shortened.

When the the inverse voltage $V_R$ is impressed to the solenoid 70 of the fuel injection valve by the inverse excitation signal $P_R$, as mentioned above, the output of the starting period signal $P_P$ is prohibited. Therefore, the starting period signal $P_P$ is not generated even when the drive pulse signal S is made Low level by the noise n shown in FIG. 8. That is, the high voltage $V_H$ is never impressed while the inverse voltage $V_R$ impressed to the solenoid 70.

As described above in detail, according to the first embodiment, driving means is provided for each of at least two solenoids, of which driving periods do not overlap, and circuits in the driving means are shared with regard to the driving of these solenoids. Further, when one solenoid is driven based on a drive pulse signal, the input of another drive pulse signal corresponding to the other solenoids is prohibited. Since the circuits are shared with regard to the driving of at least two solenoids, it is possible to plan simplification and cost reduction of circuit composition. Since the input of a drive pulse signal for the other solenoid is not accepted while one solenoid is driven, the common circuit sections are not simultaneously used by a noise mixed in the drive pulse signal. As a result, it is possible to prevent malfunctions due to the simultaneous use of the common circuit sections and protect the apparatus.

Further, according to the first embodiment, since a solenoid is inversely excited for a prescribed time with an end of a holding period, a residual magnetic flux due to eddy currents of a stator and armature of a solenoid actuator is removed, and the resetting of the armature by a spring is promoted. That is, a drive finishing time of the solenoid actuator can be shortened.

According to the second embodiment, based on a drive pulse signal, a starting period signal for regulating a starting period of a solenoid, a holding period signal for regulating a holding period following the starting period, and an inverse excitation signal for regulating an inverse excitation period following the holding period are given. A high voltage is impressed to the solenoid while the starting period signal is given, a holding current is given to the solenoid while the holding period signal is given, and a voltage with an inverse polarity, compared with a polarity during driving, is given to the solenoid. Further, while the inverse excitation signal is given, the output of the starting period signal is prohibited. Since the solenoid is inversely excited following an end of the holding period, a residual magnetic flux due to eddy currents of a stator and armature of a solenoid actuator is degaussed, and the resetting of the armature by a spring is promoted. That is, a drive finishing time of the solenoid actuator can be shortened. Since the output of the starting period signal is prohibited while the inverse excitation signal is given, no starting period signal which permits the impression of a high voltage by a noise mixed in the drive pulse signal while an inverse voltage is impressed is given to the solenoid. As a result, it is possible to prevent malfunctions and protect the apparatus.

From the foregoing it will now be apparent that a new and improved solenoid driving apparatus has been found. It should be understood of course that the embodiments disclosed are merely illustrative and are not intended to limit the scope of the invention. Reference should be made to the appended claims, rather than the specifications as indicating the scope of the invention.

What is claimed is:

1. A solenoid driving apparatus comprising:

at least two solenoids of which driving periods do not overlap;

driving means, responsive to control signal informations corresponding to the solenoids respectively, for driving each of the solenoids based on a corresponding control signal information, said driving means including at least one circuit section shared for driving each of said solenoids; and signal generating means, responsive to drive pulse signals corresponding to the solenoids respectively, for generating the control signal information for each of the solenoids based on a corresponding drive pulse signal and giving the control signal information to said driving means, said signal generating means rejecting an input of any drive pulse signal corresponding to another solenoid while the control signal information is given to said driving means based on the drive pulse signal corresponding to one solenoid.

2. The solenoid driving apparatus of claim 1, wherein said signal generating means gives said driving means a starting period signal for regulating a starting period, a holding period signal for regulating a holding period following the starting period, and an inverse excitation signal for regulating an inverse excitation period following the holding period, as the control signal information, and said driving means includes starting means for impressing a high voltage to a corresponding solenoid while the starting period signal is given, holding means for supplying a holding current to a corresponding solenoid while the holding period signal is given, and inverse excitation means for impressing an inverse voltage to a corresponding solenoid while the inverse excitation signal is given.

3. The solenoid driving apparatus of claim 2, wherein said holding means includes current detection means and constant current supplying means which are jointly used for driving said solenoids, and said inverse excitation means includes inverse voltage supplying means which is jointly used for driving said solenoids.

4. The solenoid driving apparatus of claim 1 having first and second solenoids, wherein said signal generating means includes first inputting means for inputting a drive pulse signal corresponding to the first solenoid and second inputting means for inputting a drive pulse signal corresponding to the second solenoid, said first inputting means controls said second inputting means so that said second inputting means does not accept any drive pulse signal corresponding to the second solenoid while the control signal information of the first solenoid is outputted; and said second inputting means controls said first inputting means so that said first inputting means does not accept any drive pulse signal corresponding to the first solenoid while the control signal information of the second solenoid is outputted.

5. The solenoid driving apparatus of claim 4, wherein said first inputting means is first flip-flop means and said second inputting means is second flip-flop means, said first flip-flop means gives a first predetermined output while the control signal information of the first solenoid is outputted, and controls so that said second flip-flop means does not accept any drive pulse signal corresponding the the second solenoid based on the first predetermined output, and said second flip-flop means gives a second predetermined output while the control signal information of the second solenoid is outputted, and controls so that said first flip-flop means does not accept any drive pulse signal corresponding the the first solenoid based on the second predetermined output.

6. The solenoid driving apparatus of claim 4, wherein said signal generating means gives, as the control signal informations of the first and second solenoids, first and second solenoid starting period signals for regulating starting period, first and second solenoid holding period signals for regulating holding period following the starting period, and first and second solenoid inverse excitation signals for regulating inverse excitation period following the holding period.

7. The solenoid driving apparatus of claim 6, wherein said first inputting means gives a first predetermined output for a period between a start of the drive pulse signal corresponding to the first solenoid and an end of the first solenoid inverse excitation signal, and said second inputting means gives a second predetermined output for a period between a start of the drive pulse signal corresponding to the second solenoid and an end of the second solenoid inverse excitation signal; and wherein said signal generating means further includes;

starting period signal outputting means, responsive to the first or second predetermined output of said first or second inputting means, for outputting the first or second solenoid starting period signal for a first prescribed time period from the start of the drive pulse signal corresponding to the first or second solenoid;

control signal outputting means, responsive to the drive pulse signal corresponding to the first or second solenoid and the first or second predetermined output of said first or second inputting means, for outputting a control signal for a third prescribed time period from an end of the drive pulse signal corresponding to the first or second solenoid;

holding period signal outputting means, responsive to the first or second predetermined output of said first or second inputting means and the control signal of said control signal outputting means, for outputting the first or second holding period signal for a period from the lapse of a second prescribed time period after a start of the drive pulse signal corresponding to the first or second solenoid to an end of the corresponding drive pulse signal; and inverse excitation signal outputting means, responsive to the first or second predetermined output of said first or second inputting means and the control signal of said control signal outputting means, for outputting the first or second inverse excitation signal for said third prescribed time period from an end of the drive pulse signal corresponding to the first or second solenoid.

8. The solenoid driving apparatus of claim 7, wherein said starting period signal outputting means generates the first or second solenoid starting period signal based on the first or second predetermined output of said first or second inputting means and a signal which is the first or second predetermined output of said first or second inputting means delayed by said first prescribed time period.

9. The solenoid driving apparatus of claim 7, wherein said holding period signal outputting means generates the first or second solenoid holding period signal based on the first or second predetermined output of said first or second inputting means, a signal which is the first or second predetermined output of said first or second inputting means delayed by said second prescribed time period, and the control signal of said control signal outputting means.

10. The solenoid driving apparatus of claim 7, wherein said inverse excitation signal outputting means generates the first or second solenoid inverse excitation signal based on the first or second predetermined output of said first or second inputting means and the control signal of said control signal outputting means.

11. The solenoid driving apparatus of claim 7, wherein said first inputting means is first flip-flop means and said second inputting means is second flip-flop means, and said control signal outputting means includes third flip-flop means for inputting the first predetermined output of said first flip-flop means and the drive pulse signal corresponding to the first solenoid, and fourth flip-flop means for inputting the second predetermined output of said second flip-flop means and the drive pulse signal corresponding to the second solenoid, said control signal outputting means resetting the first, second, third and fourth flip-flop means with the lapse of said third prescribed time period from an end of the drive pulse signal corresponding to the first or second solenoid.

12. The solenoid driving apparatus of claim 11, wherein said first flip-flop means is a first JK-flip-flop circuit and said second flip-flop means is a second JK-flip-flop circuit, the input of the drive pulse signal corresponding to the other solenoid being prohibited while one solenoid is driven by giving an inverted output of the first JK-flip-flop circuit as a J input of the second JK-flip-flop circuit and giving an inverted output of the second JK-flip-flop circuit as a J input of the second JK-flip-flop circuit.

13. The solenoid driving apparatus of claim 11, wherein said control signal outputting means has a first D-flip-flop circuit as the third flip-flop means and a second D-flip-flop circuit as the fourth flip-flop means, the first or second D-flip-flop circuit generating the control signal responding to an end of corresponding drive pulse signal when the first or second predetermined output is given from said first or second flip-flop means, and said control signal generating means generating a reset signal based on a signal which is the control signal delayed by said third prescribed time period.

14. The solenoid driving apparatus of claim 6, wherein said driving means includes starting means for impressing a high voltage to corresponding solenoid while the first or second starting period signal is given, holding means for supplying a holding current to corresponding solenoid while the first or second holding period signal is given, and inverse excitation means for impressing an inverse voltage to the corresponding solenoid while the first or second inverse excitation signal is given, said holding means including current detection means and constant current supplying means jointly used for driving the first and second solenoids, and said inverse excitation means including inverse voltage supplying means jointly used for driving the first and second solenoids.

15. The solenoid driving apparatus of claim 1, wherein said solenoids are solenoids of fuel injection valves provided in an internal combustion engine.

16. A solenoid driving apparatus comprising:

a solenoid;

signal generating means, responsive to a drive pulse signal, for giving a starting period signal for regulating a starting period, a holding period signal for regulating a holding period following the starting period, and an inverse excitation signal for regulating an inverse excitation period following the holding period, said signal generating means prohibiting any output of the starting period signal during an output of the inverse excitation signal; and driving means, responsive to the starting period signal, holding period signal and inverse excitation signal from said signal generating means, for impressing a high voltage to said solenoid while the starting period signal is given, supplying a holding current to said solenoid while the holding period signal is given, and impressing an inverse voltage to said solenoid while the inverse excitation signal is given.

17. The solenoid driving apparatus of claim 16, wherein said signal generating means comprises;

starting period signal outputting means, responsive to the drive pulse signal and the inverse excitation signal, for outputting the starting period signal for a first prescribed time period from a start of the driving signal and prohibiting the output of any starting period signal while the inverse excitation signal is outputted;

holding period signal outputting means, responsive to the drive pulse signal and the starting period signal, for outputting the holding period signal for a period between an end of the starting period signal and an end of the drive pulse signal; and inverse excitation signal outputting means, responsive to the holding period signal, for outputting the inverse excitation signal for a second prescribed time period from an end of the holding period signal.

18. The solenoid driving apparatus of claim 17, wherein said starting period signal outputting means comprises;

first gate means for inputting the drive pulse signal and the inverse excitation signal, giving a predetermined output responding to the drive pulse signal when the inverse excitation signal is not outputted, and, when the inverse excitation signal is outputted, not giving the predetermined output while the inverse excitation signal is outputted even when the drive pulse is inputted;

delaying means for inputting the predetermined output of said first gate means, and delaying the predetermined output of said first gate means by said first prescribed time period; and second gate means for inputting the drive pulse signal and the output of said delaying means, and outputting the starting period signal for the first prescribed time period from the start of the drive pulse signal.

19. The solenoid driving apparatus of claim 17, wherein said holding period signal outputting means comprises;

starting period end detecting means for inputting the starting period signal and outputting a starting period end signal indicating an end of the starting period signal; and outputting means for inputting the drive pulse signal and the starting period end signal, and outputting the holding period signal for a period between the end of the starting period signal and the end of the drive pulse signal.

20. The solenoid driving apparatus of claim 19, wherein said starting period end detecting means includes a diode for clamping a start portion of the starting period signal and a differential circuit for giving a differential output representative of an end portion of the starting period signal.

21. The solenoid driving apparatus of claim 17, wherein said inverse excitation signal outputting means comprises;

third gate means for inputting the holding period signal and giving a predetermined output responding to an end of the holding period signal;

delaying means for inputting the predetermined output of said third gate means and delaying the predetermined output of said third gate means by said second prescribed time period; and fourth gate means for inputting the holding period signal and the output of said delaying means, and outputting the inverse excitation signal for said second prescribed time period from the end of the holding period signal.

22. The solenoid driving apparatus of claim 16, wherein said solenoid is a solenoid of a fuel injection valve provided in an internal combustion engine.

* * * * *